United States Patent [19]
Morton et al.

[11] Patent Number: 5,696,706
[45] Date of Patent: Dec. 9, 1997

[54] HAND-HELD MANUALLY OPERABLE INSTRUMENTS DETERMINING AND DISPLAYING LAP SPEEDS ABOUT A TRACK AND COMPARING DIFFERENT LAPS AND RACERS

[76] Inventors: Curtis Eugene Morton, Rte. 1, Box 441A, Cannelton, Ind. 47520; Vincent Paul Lipton, 3829 Buckland Sq., Owensboro, Ky. 42301; Donald L. Owens, 345 Robin Cir., Lewisport, Ky. 42351

[21] Appl. No.: 628,027

[22] Filed: Apr. 4, 1996

[51] Int. Cl.[6] ............................................. G01C 23/00
[52] U.S. Cl. .................... 364/565; 364/516; 364/561; 364/551.01; 368/2; 368/6; 340/323 R
[58] Field of Search ..................... 364/565, 424.01, 364/561, 516; 73/488, 491; 324/178, 160; 368/2, 110, 6; 340/323 R

[56] References Cited

U.S. PATENT DOCUMENTS

| | | |
|---|---|---|
| 2,635,692 | 4/1953 | Scheske . |
| 4,352,064 | 9/1982 | Dunn .................................. 324/178 |
| 4,367,051 | 1/1983 | Inoue .................................. 368/111 |
| 5,163,014 | 11/1992 | Calimeri ............................ 364/565 |
| 5,222,024 | 6/1993 | Orita et al. ......................... 364/468 |
| 5,241,487 | 8/1993 | Bianco ................................ 364/569 |
| 5,553,007 | 9/1996 | Brisson .............................. 364/561 |

*Primary Examiner*—Emanuel T. Voeltz
*Assistant Examiner*—Shah Kamini
*Attorney, Agent, or Firm*—Laurence R. Brown

[57] ABSTRACT

A hand-held and operated, instantaneous readout, portable electronic instrument is disclosed, which may be used by an observer from the grandstands to determine the speed of racers such as racing cars, horses, athletes, etc. over a lap of a race-track and to comparatively display the speeds of one racer over different laps and the speeds of different racers.

6 Claims, 3 Drawing Sheets

HAND-HELD MANUALLY OPERABLE INSTRUMENTS DETERMINING AND DISPLAYING LAP SPEEDS ABOUT A TRACK AND COMPARING DIFFERENT LAPS AND RACERS

TECHNICAL FIELD

This invention relates to electronic speed measurement instruments and more particularly it relates to portable manually operated devices for use of spectators at race-tracks to determine, store and display racers' lap speeds.

BACKGROUND

Electronic timers are well known for accurately timing the times and speeds of automobiles along a highway. Other timers are employed at race-tracks to determine racing speeds for cars, horses and athletes. However such timers are generally specially constructed and expensive electronic instruments, which are not adapted for personal involvement and private use of the fans attending racing events.

The technique for accurate measurement of racing speeds with prior art racetrack instruments is not compatible within the expertise of racing fans in general who may wish to personally monitor trials or performance at trackside. Even if instrumentation is available which might be able to determine lap speeds, it would be critically dependent upon intrusive sensors mounted along the raceway, as well as the technique and knowledge of using electronic data processors to accurately determine lap times. That would be impractical for personal use of fans at track side. For such fans the process of interpretation of elapsed times such as obtainable by stop watches into speeds would interfere with and interrupt the user's involvement in the progress of the race. General purpose calculators and computers are not adapted to provide speed calculations without manipulation of a set of keys to program a sequence of different calculations and thus would not be a satisfactory solution for providing a simple to use trackside instrument for determining lap speeds and accompanying information for convenient reference.

Thus, instantaneous results from fool-proof simplified operation of a spectator's hand held instrument is an important advance in the art. Any requirements to go through a sequence of program steps or an interim manual interpretation of data would not be suitable in the environment of a trackside fan who is intent upon following a racer without interruption of the personal involvement in the race for making calculations when the race is being run.

Thus there is not available in the prior art any personally used inexpensive special purpose comprehensive racetrack oriented instrumentation that is simple to operate and adapted for the private and personal use of a race-track observer positioned at a non-critical location, such as in a seat in the grandstands to determine and display comparatively the speed of one or more racers over one or for recording speed over several laps for comparison of the speeds of one or more racers.

DISCLOSURE OF THE INVENTION

This invention provides a special purpose portable computer for racing fans, particularly adapted for car races. Thus, a hand-held and operated, instantaneous readout, portable electronic instrument is adapted for use by an observer from the grandstands to determine the speed of racers such as racing cars, horses, athletes, etc. over one or more laps of a race-track.

An embodiment particularly adapted for car racing tracks records and comparatively displays the speeds of several racing cars over different laps.

THE PREFERRED EMBODIMENT

Figure 1:
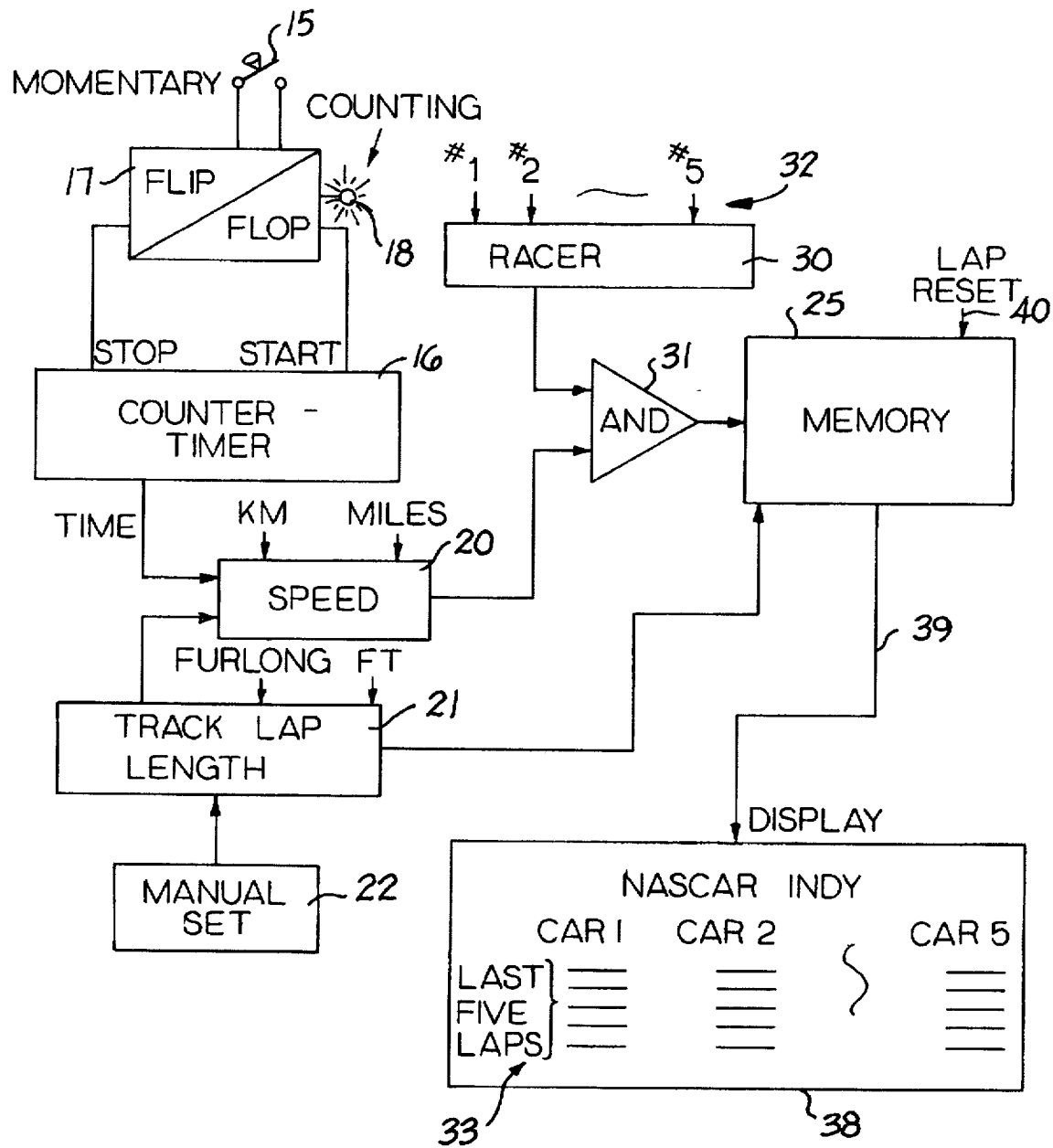
FIG. 1 is a block circuit diagram of a special purpose portable instrument embodiment of this invention for determining speed of one or more racers about one or more laps on a track, memorizing and displaying that speed.

The block circuit diagram of FIG. 1 illustrates a preferred portable lap speed calculating instrument embodiment of the invention. Its operation in the simplest mode is now described with reference to the various system elements shown.

The primary function of the instrument is to provide to a track-side observer, for example sitting in a grandstand, a personal and portable lap speed indicator. For this purpose a single operating button 15 is employed to start and stop the electronic timer 16 by means of the intermediate flip-flop circuit 17. Thus a first push of the button starts the timer 16 and the second push stops it. When the timer is counting, the indicator lamp 18 is actuated to avoid any questions about the status of the counter. Provisions can be made simply for battery power and a power switch (not illustrated) that resets the timer when power is initially turned on. After that the stop thrust of button 15 resets the counter for a new timing cycle and the lamp 18 is extinguished until the counting resumes.

Output speed for a timing cycle of one or more laps of the track is determined by calculations in the speed register 20 in response to the track lap length input that may be introduced at block 21. For practical purposes in the U.S. the track length is in miles or feet and the speed is displayed in miles per hour. The drawing notation indicates possible variations to process kilometers or to enter furlongs for horse racing tracks, for example. In a more comprehensive instrument a manual setting of track length is provided at 22. In a special purpose instrument for use at a particular race track, such as Indianapolis, the Indy track length may be preset and stored. In other embodiments such as one for car racing there may be internal storage of the standard track lengths about the racing circuit, wherein the manual set feature 22 can scan and select the appropriate track. Thus the stored track information is introduced into the memory 25 for recall when desired. In the simplest embodiment however, the speed calculation device at block 20 displays a lap speed, which is immediately available whenever the counter is stopped. Such an instrument may be very inexpensive in view of electronic timers and simple electronic calculators currently available in the marketplace.

The instrument in a more versatile embodiment will provide for comparison of several lap speeds, and comparison of several racers. Thus, at racer box 30, the identification of several racing cars may be entered for correlation at AND circuit 31 with corresponding speeds and direction into respective locations in memory 25 for recall. Thus the speed monitored for a particular lap may be identified by a push button or the like for cars #1 to #5 and automatically sorted into respective recall files.

Furthermore, the several laps indicated at 33 in display 38 activated upon demand at lead 39 may be sequentially held for the respective cars in revolving memory files so that the lap speeds for the last five laps may be compared. Appropriate reset means can be provided such as at lap reset lead 40 for clearing the memory files for a new race. Provisions may also be made for printout of race data either currently or from storage in memory 25 at a later date, if that feature is desired.

For accurately recording the speed of a lap, an observer need only be located where the racers pass a visible reference mark, such as a post or window edge and manually actuate the push button at the start and end of a lap. Provisions may be made for averaging speeds over a given number of laps also if that mode of operation is desirable.

Figure 2:
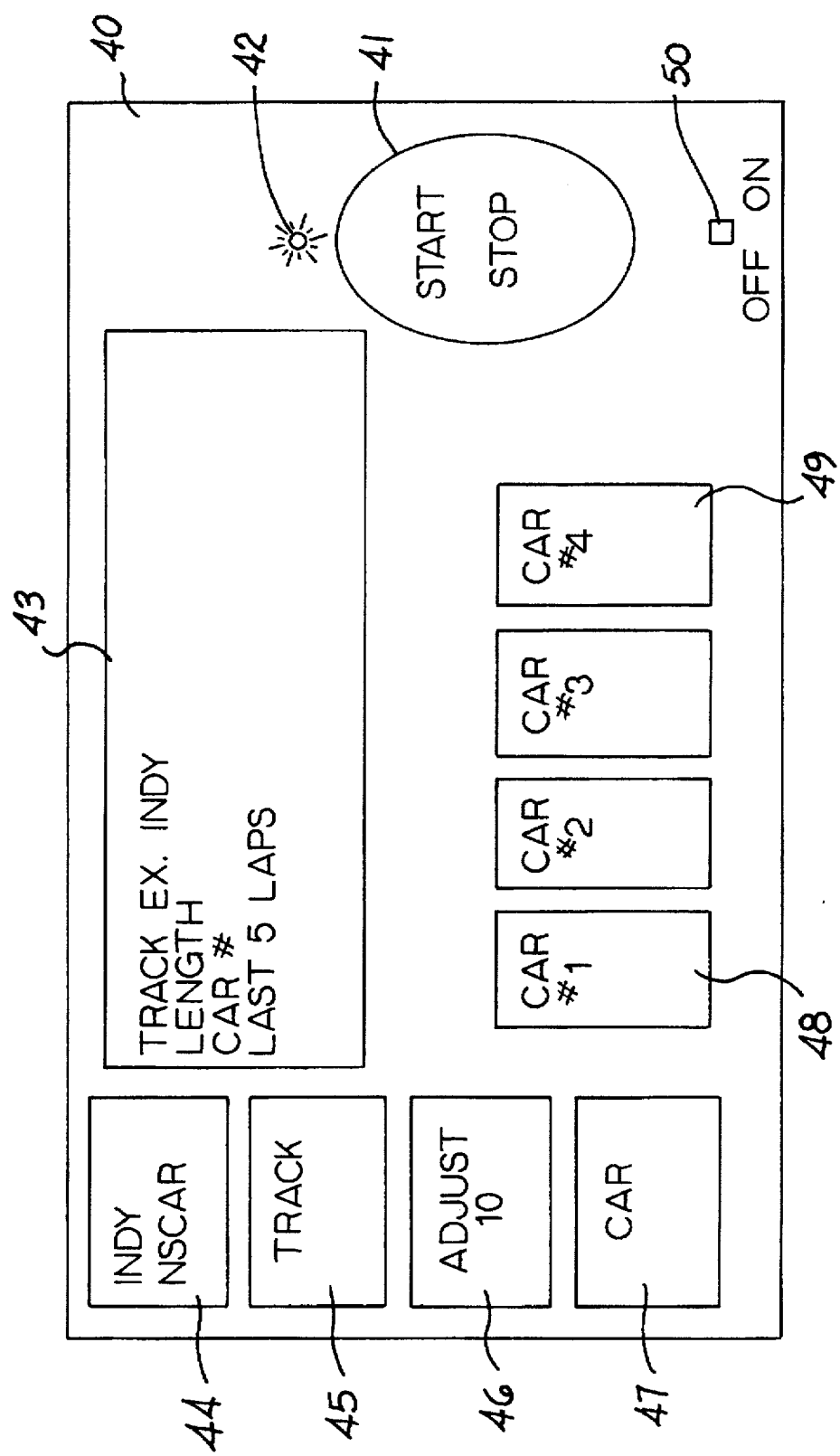
FIG. 2 is an embodiment of a control-display panel for the racing lap-speed determining instrument provided by this invention.

The more versatile embodiments of the invention may be readily constructed by programming of a general purpose computer to provide the various modes of operation illustrated by the keyboard of FIG. 2.

A track select mode of operation would permit the user to adjust the track length or select by scrolling through a menu of stored track lengths. This need only be used when moving on to a different track. Preferably the manual entry of track length information for new tracks is also provided in this mode.

A car entry mode will permit each of the car entry slots available to be identified for the respective cars of interest to be monitored in each race. A respective car button 32 may be selected to allocate a memory niche to cars so identified.

A racing mode is preferably accompanied by live presentation of the screen 38, so that all historic information to date is immediately available and is dynamically updated. In this mode the lap speeds are measured, in each case identified by the button 32 relating to the car desired. A default mode will permit car #1 to be the sole racer unless keys for cars #2 to #5 are actuated. Reversion to the track select mode will clear the decks for a new set of race entries, with provisions for historical storage and identification if the track select mode identifies a particular race.

General utility of the instrument for other purposes is possible. For example automobile speed along a highway may be checked and displayed by entry of a one-mile track and operation of the counter button 15 at two successive mile markers alongside the highway. Another such example is where a race does not encompass an entire lap, such as a 100 yard dash. The speed may be determined, provided the timing button 15 is actuated at the start and finish of the race. Also the instrument would have utility in the monitoring of a racehorse in practice as it runs about the track.

Typically the computer is pocket sized and displays a control-display panel 40 of the nature shown in FIG. 2. The internal timing counter is turned on and off by the start-stop button 41 and the lamp 42 indicates when the timer is in the counting mode. The display panel 43 typically provides information that the instrument is set to measure the speed of laps on a particular track (Indy) of a particular length, and registers the last few laps of a particular one or more cars. For example, buttons 48–49 can start the lap-speed count with button 41 and enter it into a rotating memory that retains only the last five laps, and is reset for new entries of a new race when the instrument off-on button 50 is turned off.

A desirable feature on this instrument is the stored internal information regarding the usual or major racetracks, which can be scanned for entry by button 44 and selected by button 45. In the event any track length adjustments are needed for a particular race, they may be entered by button 46. When only a single set of laps are indicated on the display 43, the button 47 may be used to scan the respective cars to display their comparative speeds. In the event that all the car speeds are displayed, the car button 47 scans the respective cars from the default Car #1 entry for measuring the speeds of laps with the start-stop button 41.

Figure 3:
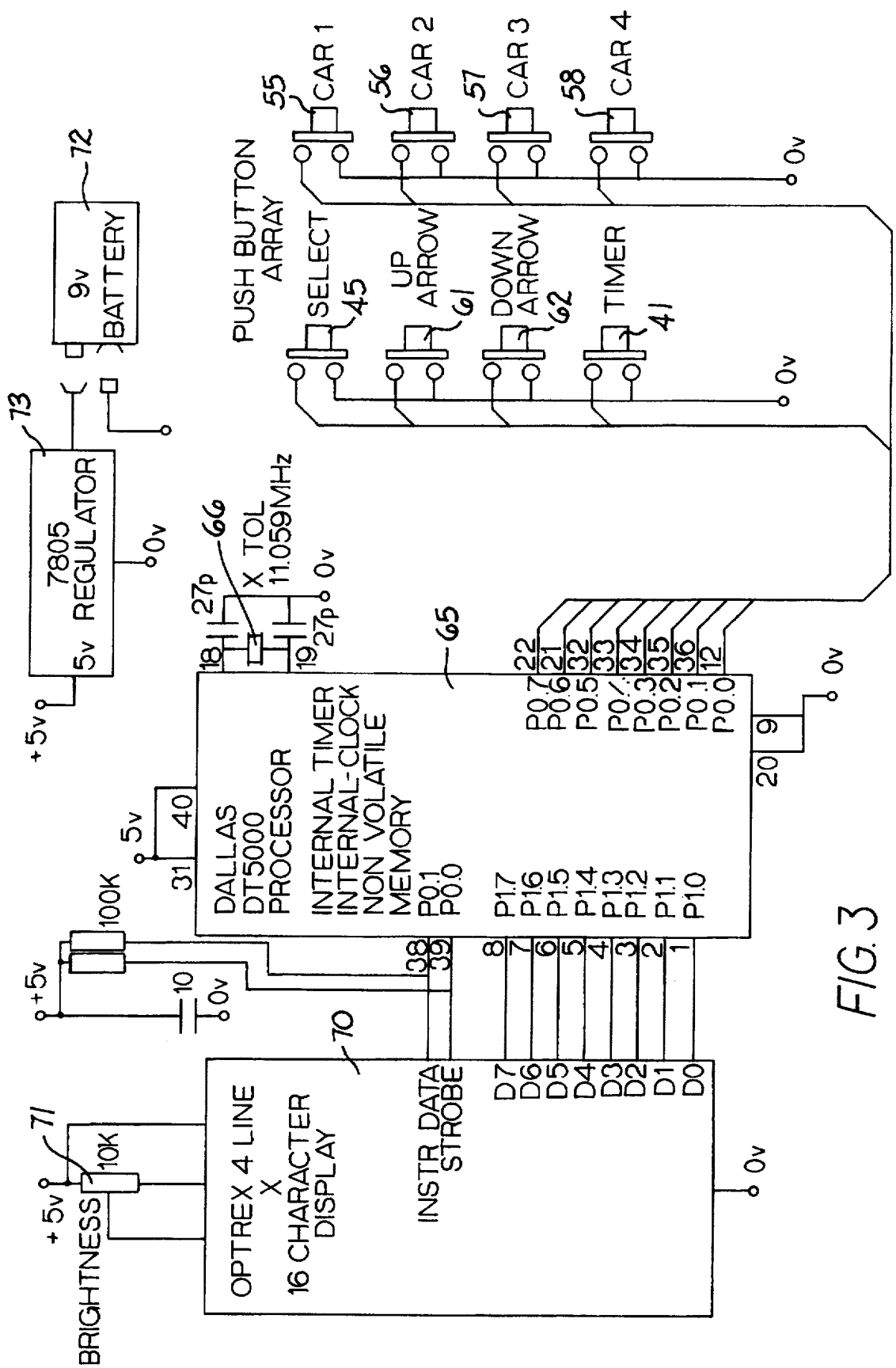
FIG. 3 is a block schematic diagram of a system embodiment of the invention.

FIG. 3 represents the schematic diagram for a further embodiment of the invention, having car identification buttons 55–58. The track select button 45 selects track length automatically from the various internally stored tracks selected from a menu by movement of a cursor up or down the menu with buttons 61, 62.

The timer block 65 controlled for accuracy by a crystal 66, then provides a count on an internal counter represented in typically MPH for auto car races. The display panel is operated from block 70, which includes brightness control 71. Power is supplied from battery 72 by way of a voltage regulator 73. The shown blocks 65, 70 and 73 are currently available commercial electronic components identified by Brand name and model. The processor 65 has provisions for programming to operate in the manner aforesaid, and to do the simple arithmetic and control functions required for this instrument.

It is thus evident that this invention has advanced the state of the art by introduction of a novel special purpose racing instrument for calculating lap speeds of a racer about a track of known length for example car lap speeds about a given race track such as the Indianapolis Speedway.

Having thus advanced the state of the art, those novel features defining the spirit and nature of the invention are set forth with particularity in the following claims.

We claim:

1. A manually operable portable electronic data processing instrument for instantaneously displaying to an observing race track patron in an off-track location the lap speeds of selected racers on a race track, comprising in combination:

digital timing means responsive to manually entered start and stop signals, manually operable switching means for supplying said start and stop signals by observation of the patron as the racer passes a selected marker of the patron's choice along the patron's line of sight indicative precisely of a racer's position about the track, track length entry means for establishing the distance of a lap about a given race track, and speed computing means responsive to the digital timing means, the manually entered start and stop signals and the established distance of a lap for determining the speed of a racer traversing one lap on the racetrack.

2. The instrument defined in claim 1 further comprising:
selective means for recording and displaying lap speeds of different racers moving about the race track.

3. The instrument defined in claim 1 wherein the manually operable switching means comprises a single button manually operated switch for alternately providing start and stop signals.

4. The instrument defined in claim 1 further comprising:
recording means for comparatively recording speeds of a selected racer determined for a plurality of laps and corresponding display means for the comparatively recorded speeds.

5. The instrument defined in claim 1 having stored in internal non-volatile memory, the length of a plurality of race tracks.

6. The instrument defined in claim 5 having a menu and manually operable menu scanning, permitting selection of a particular race track length.

* * * * *